United States Patent [19]
Vila-Masot et al.

[11] Patent Number: 5,229,927
[45] Date of Patent: Jul. 20, 1993

[54] SELF-SYMMETRIZING AND SELF-OSCILLATING HALF-BRIDGE POWER INVERTER

[76] Inventors: Oscar Vila-Masot, Hotel Doral Beach, Complejo Turistico "El Morro", Puerto La Cruz, Venezuela; Janos Melis, 8075 NW. 7th St., #401, Miami, Fla. 33126

[21] Appl. No.: 883,762

[22] Filed: May 15, 1992

[51] Int. Cl.$^5$ .......................... H02M 7/5383
[52] U.S. Cl. .................. 363/23; 363/98; 363/132; 315/219; 315/226; 315/291
[58] Field of Search .......... 363/17, 22, 23, 56, 363/58, 98, 132, 133; 315/219, 226, 291, DIG. 7

[56] References Cited

U.S. PATENT DOCUMENTS

| | | | |
|---|---|---|---|
| 4,935,673 | 6/1990 | Vila-Masot et al. | 315/219 |
| 4,989,127 | 1/1991 | Wegener | 363/98 X |
| 5,014,182 | 5/1991 | Cohen | 363/132 |
| 5,097,183 | 3/1992 | Vila-Masot et al. | 363/132 X |

Primary Examiner—Emanuel T. Voeltz
Attorney, Agent, or Firm—Hoffman, Wasson & Gitler

[57] ABSTRACT

The invention pertains to a switchmode DC-to-AC inverter, and particularly to a self-symmetrized and self-oscillating half-bridge inverter. More particularly, the invention pertains to a high frequency ballast for gas discharge devices, especially for high intensity discharge lamps, including power control, frequency modulation and high voltage ignition apparatus.

4 Claims, 4 Drawing Sheets ed as well as the final cost. The following detailed description of the invention will be made in conjunction with the accompanying drawings.

SELF-SYMMETRIZING AND SELF-OSCILLATING HALF-BRIDGE POWER INVERTER

BACKGROUND OF THE INVENTION

1. Field of the Invention

The present invention relates to high frequency DC-to-AC switchmode power converters and specifically to self-oscillating half-bridge inverters. More specifically, the present invention relates to a high frequency ballast for high intensity discharge lamps.

2. Prior Art

Self-oscillating DC-to-AC inverters have a significant position in the field of switchmode power converters, due to their simplicity and usefulness. Generally, DC-to-AC inverters are configured as push-pull, half-bridge or full-bridge. One of the simplest, and oldest, DC-to-AC self-oscillating push-pull inverters is the Royer circuit. Another circuit similar to the Royer circuit, which removes the switch drive function from the main power transformer, is a self-oscillating voltage or current driven Jensen circuit. An improved version of the Jensen circuit is described in U.S. Pat. No. 4,935,673 assigned to the assignee of the present invention, showing a current driver push-pull converter used with HPS lamps. A special half-bridge configuration which can be used with HID lamps is U.S. Pat. No. 5,097,183 also assigned to the assignee of the present invention, including two specially connected half-bridge inverters as a self-oscillating master and a controlled slave. The common disadvantage of the push-pull configurations is the imbalance problem of the push-pull transformer, especially when it is applied to asymmetrical loads.

An important application of the simple self-oscillating DC-to-AC switchmode power inverter is to provide DC-to-DC transformers which are widely used in the area of DC power supplies.

Another important application of the simple self-oscillating DC-to-AC switchmode power inverter, is supplying high intensity discharge (HID) lamps, especially high pressure sodium (HPS) lamps in the range of 35 to 400 watts. In this case, the load impedance of the DC-to-AC inverter is a HID lamp connected in series with an inductor. In the case of a high frequency powering of the HID lamps, the interaction between the high frequency ballast and the lamp is stronger then that of a conventional ballast (acoustic resonance). This high frequency ballast is significantly better then a conventional ballast due to its lessened weight and higher efficiency. Additionally, the high frequency ballast, utilized with an HPS lamp would have a longer life time, exhibit somewhat better light efficiency and display a better color temperature.

Therefore, the critical design targets for high frequency ballasts supplying HPS lamps would be the following:

(a) very high efficiency (energy saving);

(b) ensuring that the lamp power is maintained constant during the lifetime of the lamp at ±15% input voltage fluctuation;

(c) eliminating acoustic resonances by using frequency modulation;

(d) providing high voltage ($\approx$3000 V) ignition pulses;

(e) the relative simplicity of the ballast which would result in a lower cost; and (f) reliability and longer lifetime.

SUMMARY OF THE INVENTION

It is a principal object of the present invention to provide a self-symmetrizing and self-oscillating half-bridge DC-to-AC switchmode power inverter which has a very high efficiency and the output voltage is a fully symmetrical square wave.

Another object of the present invention is to provide a self-symmetrizing and self-oscillating half-bridge DC-to-DC transformer.

A further object the present invention is to provide a self-symmetrizing and self-oscillating half-bridge DC-to-AC switchmode power inverter in which the frequency can be changed and modulated in a certain frequency range.

Another object of the present invention is to provide a power controlled and frequency modulated high frequency ballast for HID lamps.

These and other objects of the present invention will be evident from the following detailed description when read in conjunction with the accompanying drawings which illustrate the invention.

DETAILED DESCRIPTION OF THE INVENTION

Figure 1:
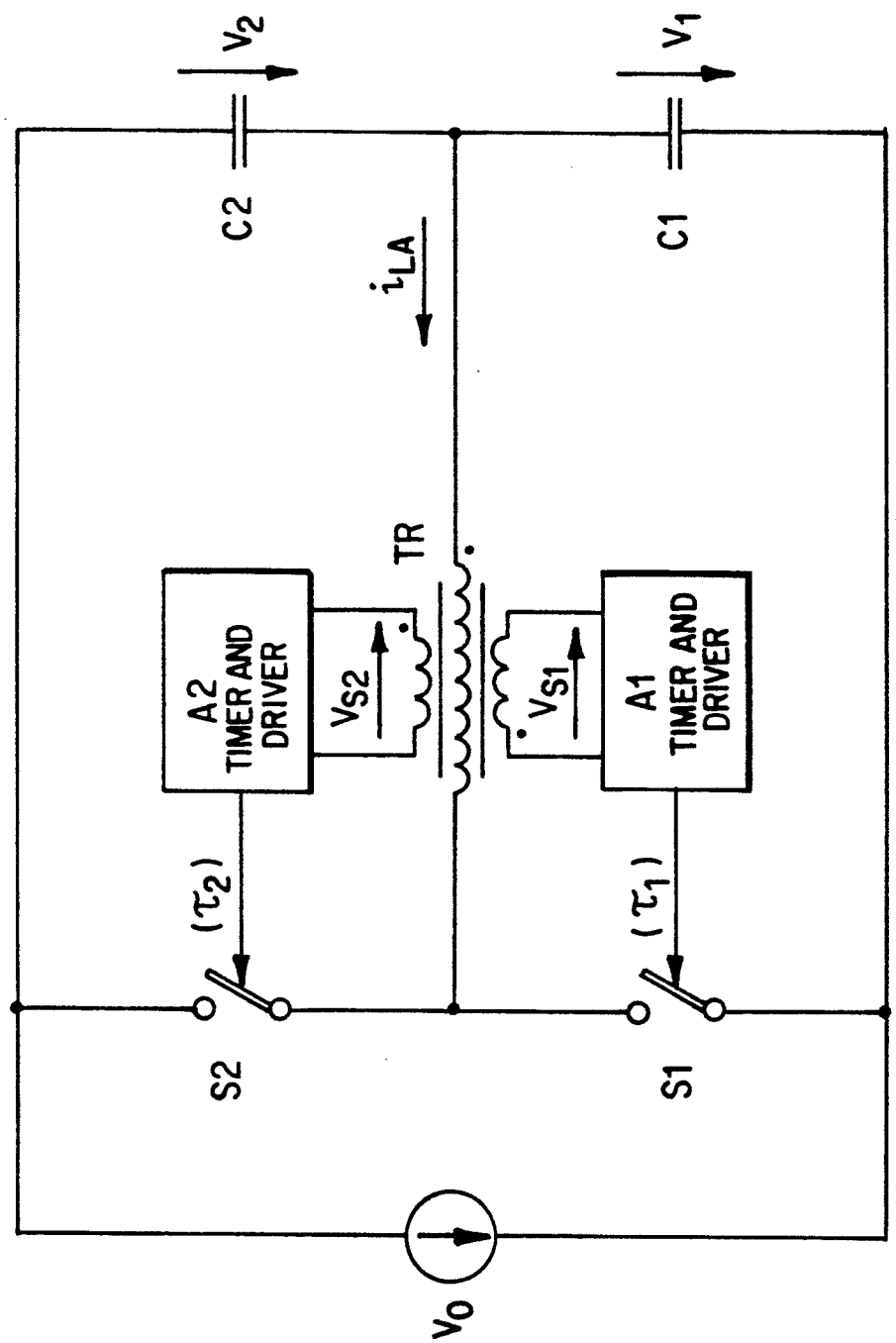
FIG. 1 illustrates a simplified diagram of a self-oscillating half-bridge configuration.

FIG. 1 illustrates a simplified circuit diagram of a self-oscillating half-bridge configuration. The conditions of steady state operation are described by the following equations:

$$\int_O^\tau i_L(t)dt = O \text{ and } \int_O^\tau u_L(t)dt = O$$

where $\tau$ is the period time.

Therefore the DC component of the control transformer TR is zero ($I_{LA}=O$). Furthermore $$V_1\tau_1 = V_2\tau_2 \qquad (1)$$

where $\tau_1$ and $\tau_2$ are the switching times and $\tau_1+\tau_2=\tau$ and $V_1$, $V_2$ are the average voltages of the voltage divider capacitors $C_1$ and $C_2$.

In FIG. 1, A1 and A2 represent the timer and driver circuits of electronically controlled switches $S_1$ and $S_2$. If one assumes that the switching times are proportional to the secondary voltages $V_{S1}$ and $V_{S2}$, then:

$$\tau_1 = a \cdot V_{S1} \text{ and } \tau_2 = a \cdot V_{S2} \qquad (2)$$

where $a$ is a constant determined by the practical timing circuit as shall be subsequently described.

Making use of equations (1), (2) we obtain $$V_{S1}^2 = V_{S2}^2$$

In our case we can consider the solution: $V_{S1}=V_{S2}$.

Since $$V_{S1} = \frac{N_{S1}}{N_p} V_1 \text{ and } V_{S2} = \frac{N_{S2}}{N_p} V_2$$

and $$V_1 + V_2 = V_0$$

we obtain the symmetrical solution in steady state ($N_{S1} = N_{S2}$)

$$V_1 = V_2 = \tfrac{1}{2} V_0 \text{ and } \tau_1 = \tau_2 = \tfrac{1}{2}\tau$$

Omitting a detailed analysis of large signal transient responses and stability, we will give only an illustrative example. If, for instance, $V_1 > V_2$, therefore $V_1\tau_1 > V_2\tau_2$ and the result is an increasing $I_{LA}$. The effect of increasing $I_{LA}$ is a decreased $V_1$ and an increased $V_2$, providing the necessary (but not sufficient condition) of an asymptotically stable operation in the steady state, characterized by $V_1 = V_2 = \tfrac{1}{2} V_0$.

Finally, let us assume that $S_1$ is ON, therefore producing an increasing magnetizing current flow in the main inductance of transformer TRI. If $S_1$ is OFF, the polarity of the primary voltage will be reserved, causing the switched ON state of $S_2$. The process will be repeated periodically providing self-oscillation.

Figure 2:
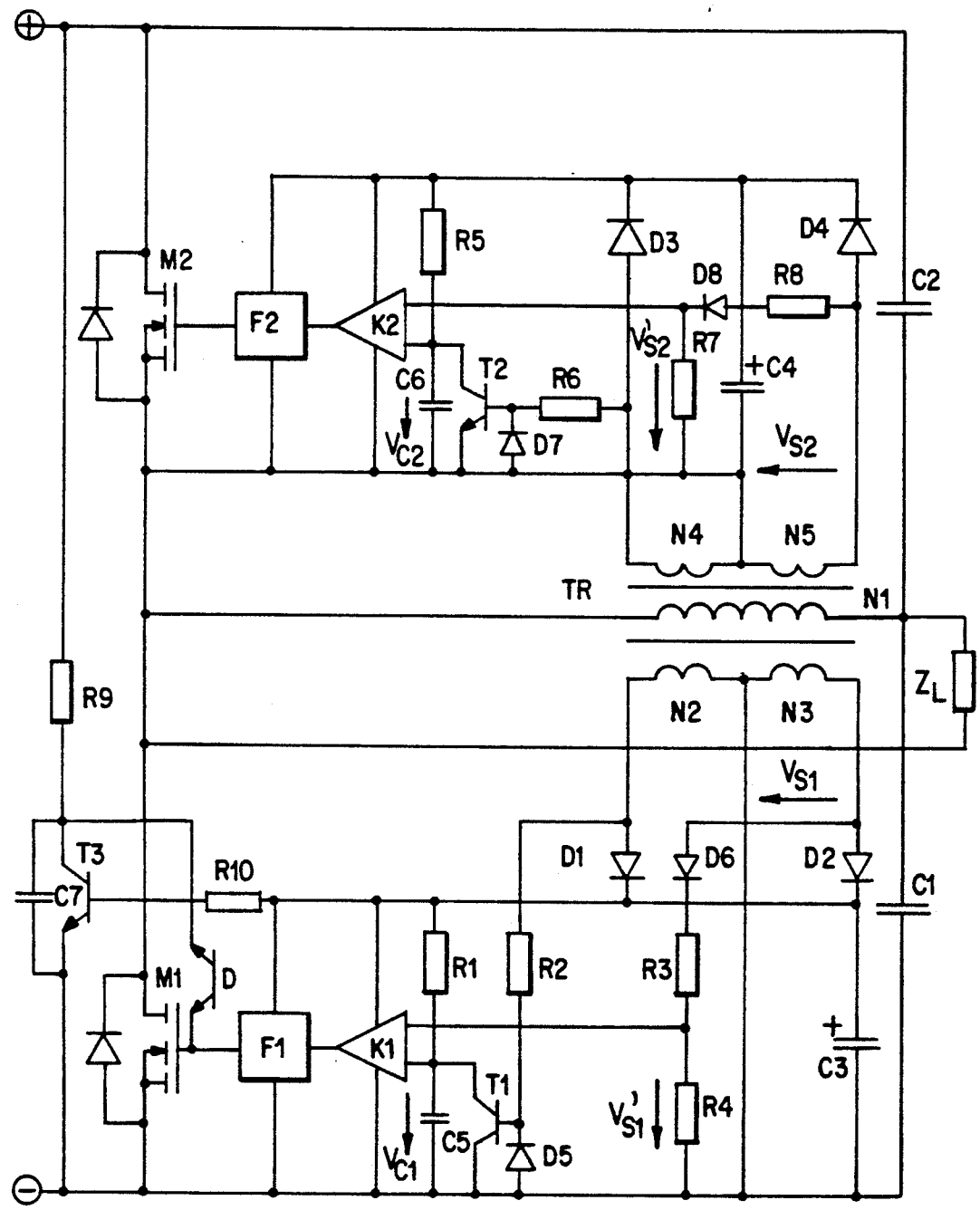
FIG. 2 shows a preferred embodiment of a self-symmetrizing and self-oscillating half-bridge DC-to-AC switchmode power inverter of the present invention.

FIG. 2 shows the detailed circuit diagram of a self-symmetrized and self-oscillating half-bridge inverter by using MOSFETs M1, M2 as electronically controlled switches. Furthermore, K1 and K2 are voltage comparators, F1 and F2 are MOSFET drivers, TR is the control transformer and $Z_L$ is the load impedance. The resistors R1, R5 connected in series capacitors C5, C6 and transistors T1, T2 respectively provide two synchronized sawtooth generators for the lower and upper part of the circuit. The resistors R3, R4 and R7, R8 are voltage divider resistors. Additionally, this circuit shows a self-switching starter circuit, wherein D is a DIAC.

Figure 3:
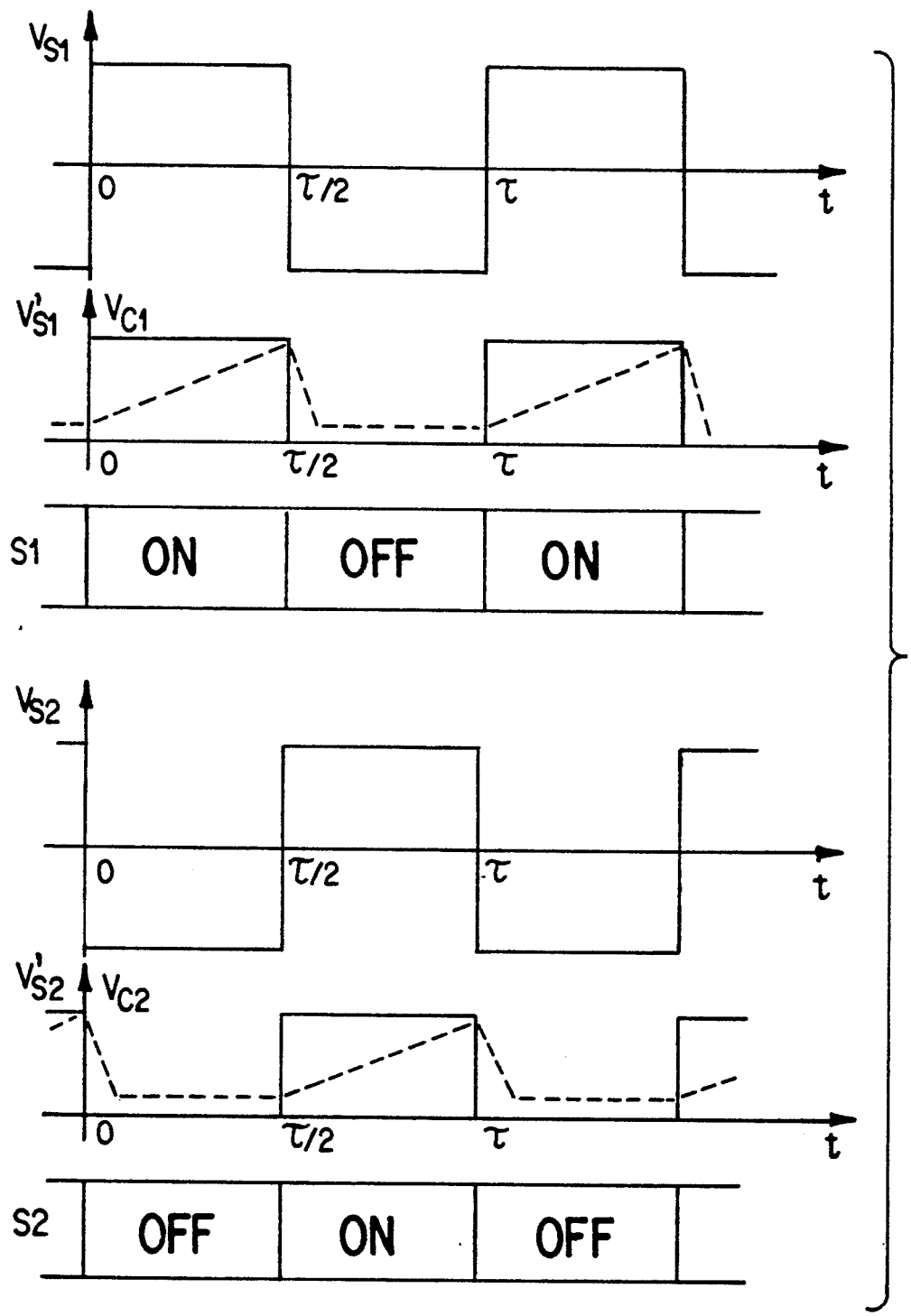
FIG. 3 shows the signal voltage of the timing circuits in steady state, according to the present invention.

The timing diagram of FIG. 3 shows the signal voltages in the steady state. The frequency can be changed by using optically controlled voltage divider resistors or by substituting resistors R1 and R5 for current sources. A second manner of changing the frequency would be by using optically controlled current sources. The result is in both cases is a changeable parameter $a$. Therefore, by equation (2), the periodical time is given as follows:

$$\tau = \frac{N_s}{N_p} a \cdot V_o$$

Substituting the load impedance by a transformer to which the output square wave voltage is rectified we get a DC-to-DC transformer.

Figure 4:
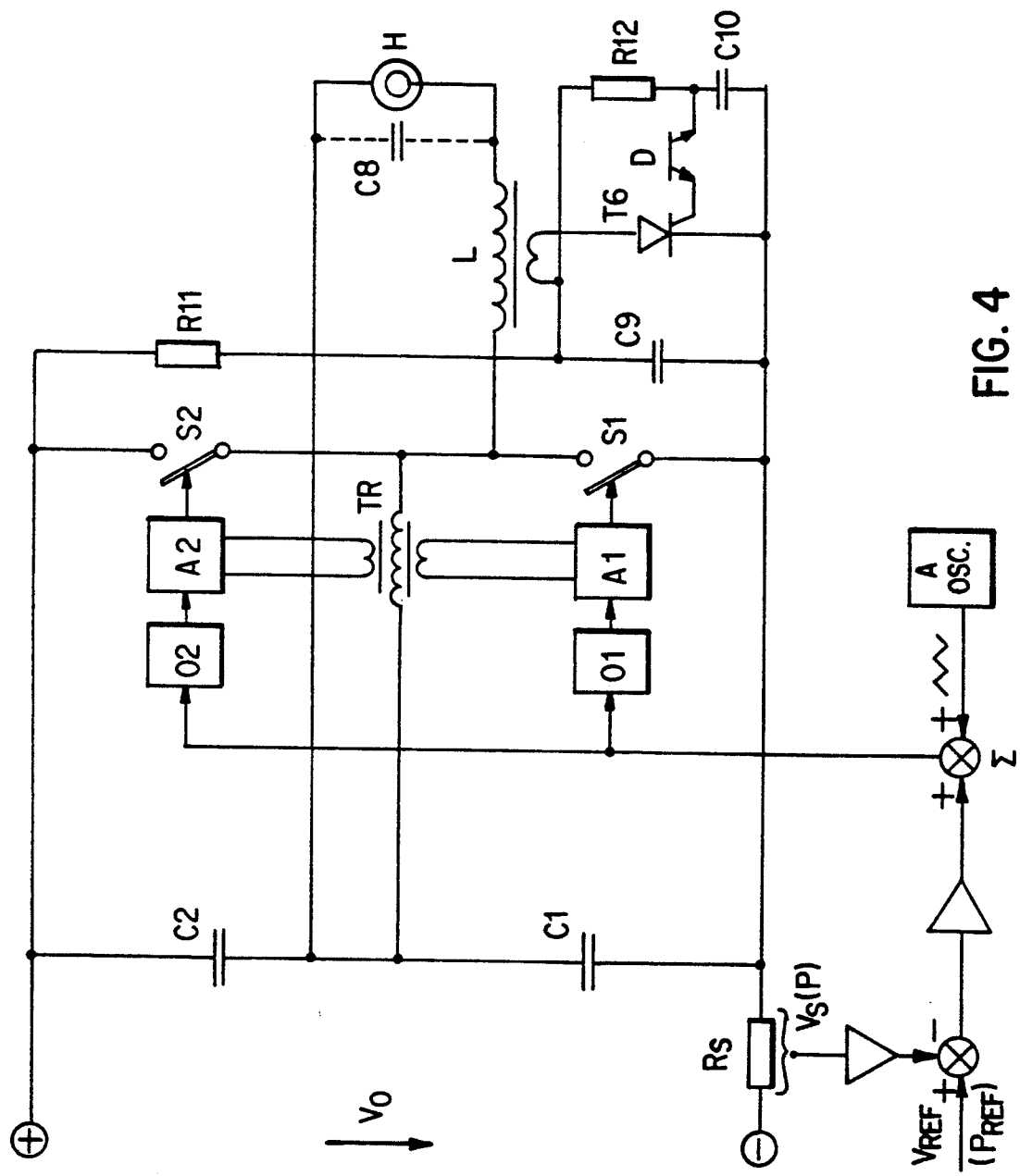
FIG. 4 shows a preferred embodiment of a power controlled and frequency modulated high frequency ballast for HID lamps especially for HPS lamps.

FIG. 4 shows a preferred embodiment of a high frequency ballast for HID, used particularly well with HPS lamps. The high frequency ballast for lamp H includes the previously described self-symmetrizing and self-oscillating half-bridge DC-to-AC inverter in which the load impedance is a HID lamp connected in series with an inductor having windings N1 and N2. The high voltage ignition signal can be achieved by the following essentially different methods.

In the first method, winding N2 is connected across a thyristor Th to a capacitor C9. As the thyristor is periodically ON, the voltage of the continuously charged capacitor C9 will reach the winding N2 and a high voltage pulse of approximately 3000 V will be induced in the winding N1, which is required to initiate an arc.

In the second method, the ignition of lamp H is provided by the series voltage resonance in the inductor L in series with capacitor C8, wherein the capacitor C8 is connected in parallel with the lamp H. In this case, the ignition voltage is a high frequency sinusoidal tuned to the third or fifth harmonic of the inverter symmetrical square wave output voltage.

FIG. 4 also shows a control unit providing a power controlled and frequency modulated ballast for HPS lamps. The timing apparatus of main switches are controlled by optocouplers 01 and 02. If the input DC voltage is stabilized, the effective power of the lamp H is proportional to the average current flowing in the shunt resistor Rs. Since the lamp power depends on the frequency, the power can be controlled by frequency. The frequency can be also changed periodically (oscillator A) by a lower modulation frequency, where the modulation depth is approximately 5% with respect to the average frequency. By using frequency modulation the acoustic resonances can be eliminated.

Changes may be made in the combination and arrangement of elements on steps as heretofore set forth in the specification and shown in the drawings, it being understood that changes may be made in the embodiment described without departing from the spirit and scope of the invention as defined in the following claims.

What is claimed is:

1. A self-symmetrizing and self-oscillating half-bridge DC-to-AC switchmode power inverter comprising:
   a DC power supply;
   a half-bridge configuration connected to said DC power supply including two voltage divider capacitors, two electronically controlled switches and a load impedance connected to a common point of said voltage divider capacitors and a point of said electronically controlled switches;
   a control transformer connected in parallel with said load impedance having a primary and at least two secondary windings;
   a pair of switching timer and driver units connected to the said electronically controlled switches and secondary windings of said control transformer, each of said timer and drive units including a switch driver, a voltage comparator, the output of which is connected to said switch driver, a synchronized sawtooth generator and voltage divider resistors connected to the inputs of said voltage comparator, wherein said voltage divider resistors are connected to said secondary winding of said control transformer providing proportional switching times to the voltages of said secondary windings of control transformer, dependent upon the voltages of said voltage divider capacitors.

2. The self-symmetrizing and self-oscillating half-bridge DC-to-AC switchmode inverter in accordance with claim 1, wherein said load impedance is a power transformer with rectified output providing an electronic DC--to-DC transformation.

3. The self-symmetrizing and self-oscillating half-bridge DC-to-AC switchmode inverter in accordance with claim 2, wherein said synchronized sawtooth generator or said voltage divider resistors are electronically controlled, providing frequency control.

4. The self-symmetrizing and self-oscillating half-bridge DC-to-AC switchmode inverter in accordance with claim 1, wherein the said load impedance is an inductor in series with a gas discharge device providing a power controlled and frequency modulated high frequency ballast.

* * * * *